US008327196B2

(12) United States Patent
Cases et al.

(10) Patent No.: US 8,327,196 B2
(45) Date of Patent: Dec. 4, 2012

(54) IDENTIFYING AN OPTIMIZED TEST BIT PATTERN FOR ANALYZING ELECTRICAL COMMUNICATIONS CHANNEL TOPOLOGIES

(75) Inventors: Moises Cases, Austin, TX (US); Bhyrav M. Mutnury, Austin, TX (US); Navraj Singh, Brandon, MS (US); Caleb J. Wesley, Winston Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 12/174,349

(22) Filed: Jul. 16, 2008

(65) Prior Publication Data

US 2010/0014569 A1    Jan. 21, 2010

(51) Int. Cl.
*G01R 31/28* (2006.01)
*G06F 11/00* (2006.01)

(52) U.S. Cl. .................................. 714/715; 714/736
(58) Field of Classification Search .................. 714/704, 714/715, 736, 819, 799, 735; 375/224
See application file for complete search history.

(56) References Cited

U.S. PATENT DOCUMENTS

| | | | |
|---|---|---|---|
| 5,400,370 A | 3/1995 | Guo | |
| 5,991,895 A * | 11/1999 | Laudon et al. | 714/6.13 |
| 6,728,901 B1 * | 4/2004 | Rajski et al. | 714/30 |
| 6,735,259 B1 | 5/2004 | Roberts et al. | |
| 6,889,357 B1 * | 5/2005 | Keeth et al. | 714/814 |
| 6,954,888 B2 * | 10/2005 | Rajski et al. | 714/739 |
| 7,225,107 B2 | 5/2007 | Buxton et al. | |
| 7,254,168 B2 | 8/2007 | Guenther | |
| 2004/0187046 A1 | 9/2004 | Lee et al. | |
| 2005/0185498 A1 | 8/2005 | Keeth et al. | |
| 2006/0245291 A1 | 11/2006 | Sakaitani | |
| 2007/0242741 A1 | 10/2007 | Carballo et al. | |

FOREIGN PATENT DOCUMENTS

EP    1 460 793 A1    9/2004

OTHER PUBLICATIONS

Equalization Method for High-Speed Serial Links; Research Disclosure; Jan. 2002; pp. 72-74; 453087 International Business Machines Corporation.

* cited by examiner

*Primary Examiner* — Phung M Chung
(74) *Attorney, Agent, or Firm* — Edward J. Lenart; Cynthia G. Seal; Biggers & Ohanian, LLP

(57) ABSTRACT

Identifying an optimized test bit pattern for analyzing electrical communications channel topologies, including: ranking according to channel quality, from worst to best, a set of channel topologies for an electrical communications channel; and for each ranked channel topology beginning with the worst, carrying out the following steps in an iterative loop until a concatenated test bit pattern and a previously optimized test bit pattern are functionally equally fit: concatenating to a previously optimized test bit pattern an additional test bit pattern; optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

18 Claims, 3 Drawing Sheets

IDENTIFYING AN OPTIMIZED TEST BIT PATTERN FOR ANALYZING ELECTRICAL COMMUNICATIONS CHANNEL TOPOLOGIES

BACKGROUND OF THE INVENTION

1. Field of the Invention

The field of the invention is data processing, or, more specifically, methods, apparatus, and products for identifying an optimized test bit pattern for analyzing electrical communications channel topologies.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Today's computer systems often contain many high speed communications channels. The effect of various design parameters of communications channels on the integrity of high frequency signals carried by the communication channels is constantly increasing. Modeling such effects is also increasingly more difficult. Often it is cost-prohibitive or time-prohibitive to physically implement such design parameters for evaluating performance of the communications channel. Analyzing the effects of various design parameters of a communications channel in a pre-layout design space is an economical alternative to physically implementing the various design parameters. One common way to analyze the quality of a communications channel is to plot an eye diagram of a signal at the receiver, where the signal is transmitted through the communications channel. Finding the best and worst cases of all the various design parameters for a communications channel is important to perform effective pre-layout analysis. To accurately estimate a realistic eye diagram for a particular set of the various design parameters, it is common practice to apply a long random bit stream to the communications channel. While long bit streams contain enough power to excite the communications channel uniformly across the relevant bandwidth, simulation and analysis of such a long random bit stream is time consuming. Reducing the length of the bit stream may reduce analysis time but may also provide inaccurate results with respect to different sets of the various design parameters of the communications channel.

SUMMARY OF THE INVENTION

Computer-implemented methods, apparatus, and products for identifying an optimized test bit pattern for analyzing electrical communications channel topologies, including: ranking according to channel quality, from worst to best, a set of channel topologies for an electrical communications channel; and for each ranked channel topology beginning with the worst, carrying out the following steps in an iterative loop until a concatenated test bit pattern and a previously optimized test bit pattern are functionally equally fit: concatenating to a previously optimized test bit pattern an additional test bit pattern, the additional test bit pattern having a predetermined additional test bit pattern length and additional test bit pattern values; optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
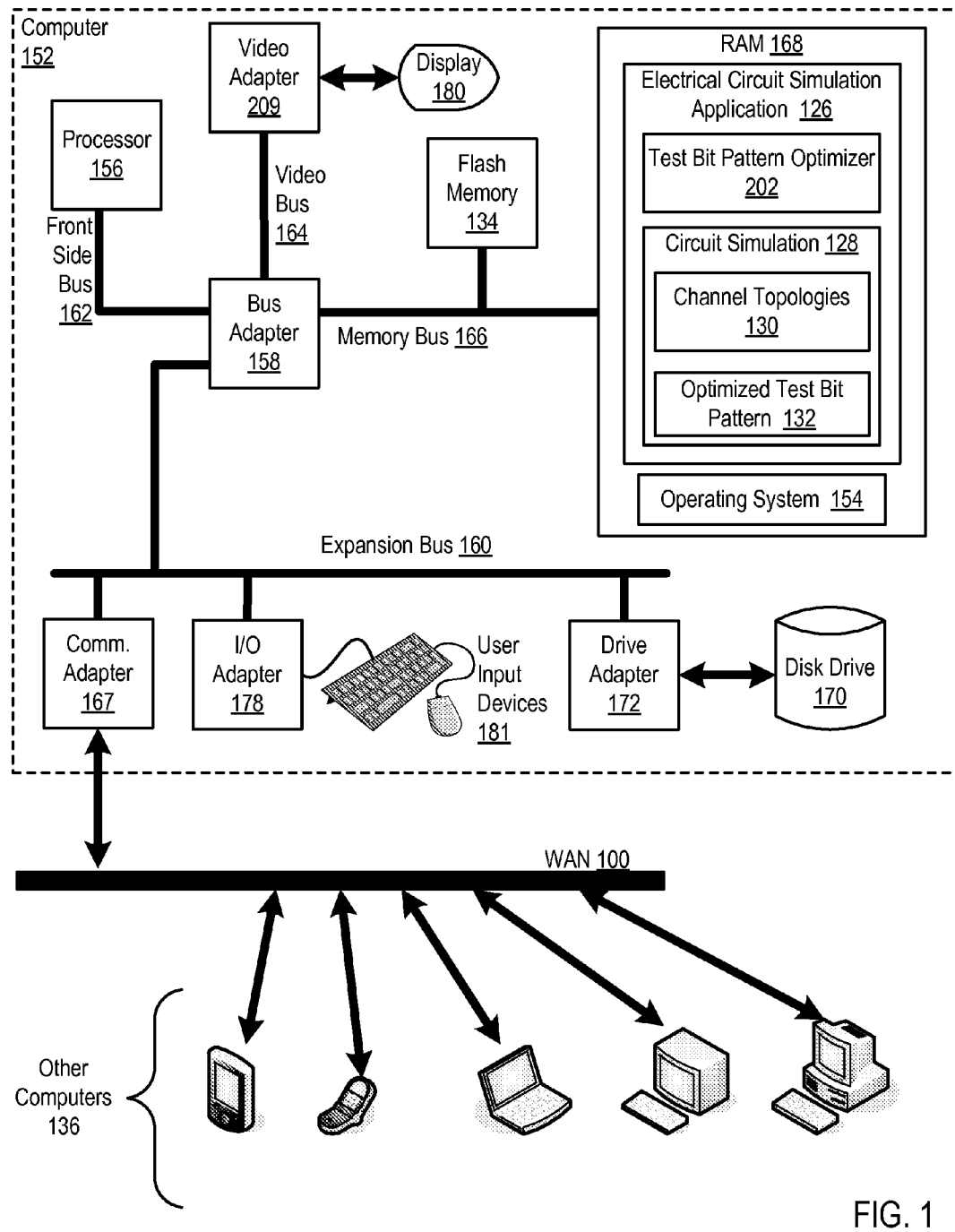
FIG. 1 sets forth a functional block diagram of an exemplary system for identifying an optimized test bit pattern for analyzing electrical communications channel topologies according to embodiments of the present invention.

Exemplary methods, apparatus, and products for identifying an optimized test bit pattern for analyzing electrical communications channel topologies in accordance with the present invention are described with reference to the accompanying drawings, beginning with FIG. 1. FIG. 1 sets forth a functional block diagram of an exemplary system for identifying an optimized test bit pattern for analyzing electrical communications channel topologies according to embodiments of the present invention.

The system of FIG. 1 includes a computer (152) connected for data communications to other computers (136) through a wide area network (100). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an electrical circuit simulation software application (126), a set of computer program instructions capable of simulating operation of user-designed electrical circuits. Examples of electrical circuit simulation software application which may be improved for identifying an optimized test bit pattern for analyzing electrical communications channel topologies according to embodiments of the present invention include PSpice™, SIMetrix™, TINA-TI™, MultiSIM™, Micro-Cap™, and other SPICE (Simulation Program with Integrated Circuit Emphasis) applications as will occur to those of skill in the art.

In the example of FIG. 1 the electrical circuit simulation application (126) includes a circuit simulation (128), a definition of a user-designed electrical circuit that includes a communications channel having any number of channel topologies (130) as may occur to readers of skill in the art. An electrical communications channel as the term is used in this specification refers to any channel capable carrying a bit pattern, that is an electrical signal representing a pattern of binary bits, from a transmitter to a receiver. In its most basic form, an electrical communications channel is a wire in a electrical circuit or a trace on a printed circuit board that connects a transmitter and receiver. Examples of electrical communications channels in the computer (152) of FIG. 1 include a wire of the memory bus (166) connecting the bus adapter (158) to the RAM (168), a wire of the video bus (164) connecting the bus adapter (158) to the video adapter (209), and so on as will occur to those of skill in the art.

A channel topology is a defined configuration of an electrical communications channel. Such configuration may include one or more configuration parameters such as a transmission lead length, an impedance of the transmission lead, a resistance of the receiver, driver strength of a transmitter, and so on as will occur to those of skill in the art. A set of configuration parameters represents a single channel topology for an electrical communications channel. Changing the value of any one configuration parameter defines another channel topology. Readers of skill in the art will recognize then that many different channel topologies exist for a particular electrical communications channel.

The electrical circuit simulation software application (126) may include a test bit pattern optimizer (202), a set of computer program instructions capable of identifying an optimized test bit pattern (132) for analyzing electrical communications channel topologies according to embodiments of the present invention.

A bit pattern is a unique pattern of binary bits represented in electrical signal transmitted along an electrical communications channel. Each bit in a bit pattern has a particular binary value, either 0 or 1, and each bit pattern has a particular length. For ease of explanation consider, as example bit patterns, a first bit pattern '1100' and a second bit pattern '10101.' The first bit pattern is 4 bits long and has values of 1, 1, 0, and 0. The second bit pattern is 5 bits long and has values of 1, 0, 1, 0, and 1.

A test bit pattern is a bit pattern transmitted along an electrical communications channel in an electrical circuit simulation (128) for analyzing the electrical communications channel. Such an analysis may include generating an eye pattern or eye diagram for the electrical communications channel. An eye pattern may be generated by measuring, at a receiver connected to a transmitter through an electrical communications channel, the value of a transmitted test bit pattern and superimposing the measured values of two or more clock cycles of the test bit pattern. An eye pattern is so called because, for several types of coding, the pattern looks like one or more eyes between a pair of rails. The opening of the eye has a vertical height and a horizontal width which may be used to derive a number of communication channel performance measurements. Generally, an open eye pattern corresponds to minimal signal distortion along the communications channel, and a closure of an eye pattern corresponds to intersymbol interference and noise in the communications channel. Specifically, as vertical height of the eye opening decreases, the presence of additive noise in the signal increases and as the width of the eye opening decreases the presence of jitter in the signal increases.

In prior art, a relatively short test bit pattern could be generated for accurate results of such an analysis for only one channel topology. Using the same generated bit pattern for different channel topologies in prior art resulted in inaccurate analysis. For accurate results of analysis of multiple different channel topologies, in prior art, a relatively long, non-optimized, bit pattern was used, possibly thousands of bits in length. Simulating transmission of such a long bit pattern on an electrical communications channel for analysis is time-consuming and requires a large amount of computational overhead of a computer processor executing the electrical circuit simulation.

In contrast to the longer non-optimized test bit patterns and the shorter topology dependent test bit patterns of the prior art, an optimized test bit pattern according to embodiments of the present invention, is a channel topology independent test bit pattern of relatively short length which provides accurate analysis of multiple different channel topologies of a communications channel. The optimized test bit pattern is 'channel topology independent' in that the optimized test bit pattern provides accurate analysis of different channel topologies of an electrical communications channel without changing the length of the pattern or values of the bits of the pattern from one channel topology to the next. That is, the same optimized test bit pattern may be used for accurate analysis of every different channel topology of an electrical communications channel.

The test bit pattern optimizer (202), may identify an optimized test bit pattern (132) for analyzing electrical communications channel topologies (130) according to embodiments of the present invention by ranking according to channel quality, from worst to best, a set of channel topologies for an electrical communications channel; and for each ranked channel topology beginning with the worst, until a concatenated test bit pattern and a previously optimized test bit pattern are functionally equally fit, carrying out the following steps in an iterative loop: concatenating to a previously optimized test bit pattern an additional test bit pattern, the additional test bit pattern having a predetermined additional test bit pattern length and additional test bit pattern values; optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

In the example of FIG. 1, the test bit pattern optimizer (202) is depicted as a component of an electrical circuit simulation application (126) for ease of explanation. Readers of skill in the art will recognize however that such a set of computer program instructions capable of identifying an optimized test bit pattern for analyzing electrical communications channel topologies in accordance with embodiments of the present invention may be implemented as stand-alone module of computer program instructions, as a plug-in for an electrical circuit simulation software application (126) or in other ways.

Also stored in RAM (168) is an operating system (154). Operating systems useful in computer system capable of identifying an optimized test bit pattern for analyzing electrical communications channel topologies according to embodiments of the present invention include UNIX™, Linux™, Microsoft XP™, Microsoft Vista™, AIX™, IBM's i5/OS™, and others as will occur to those of skill in the art. The operating system (154), electrical circuit simulation software application (126), and test bit pattern optimizer (202), in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that identifying an optimized test bit pattern for analyzing electrical communications channel topologies according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the server (102), personal digital assistant ('PDA') (104), mobile phone (106), laptop (108), workstation (110), personal computer (112). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for identifying an optimized test bit pattern for analyzing electrical communications channel topologies according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
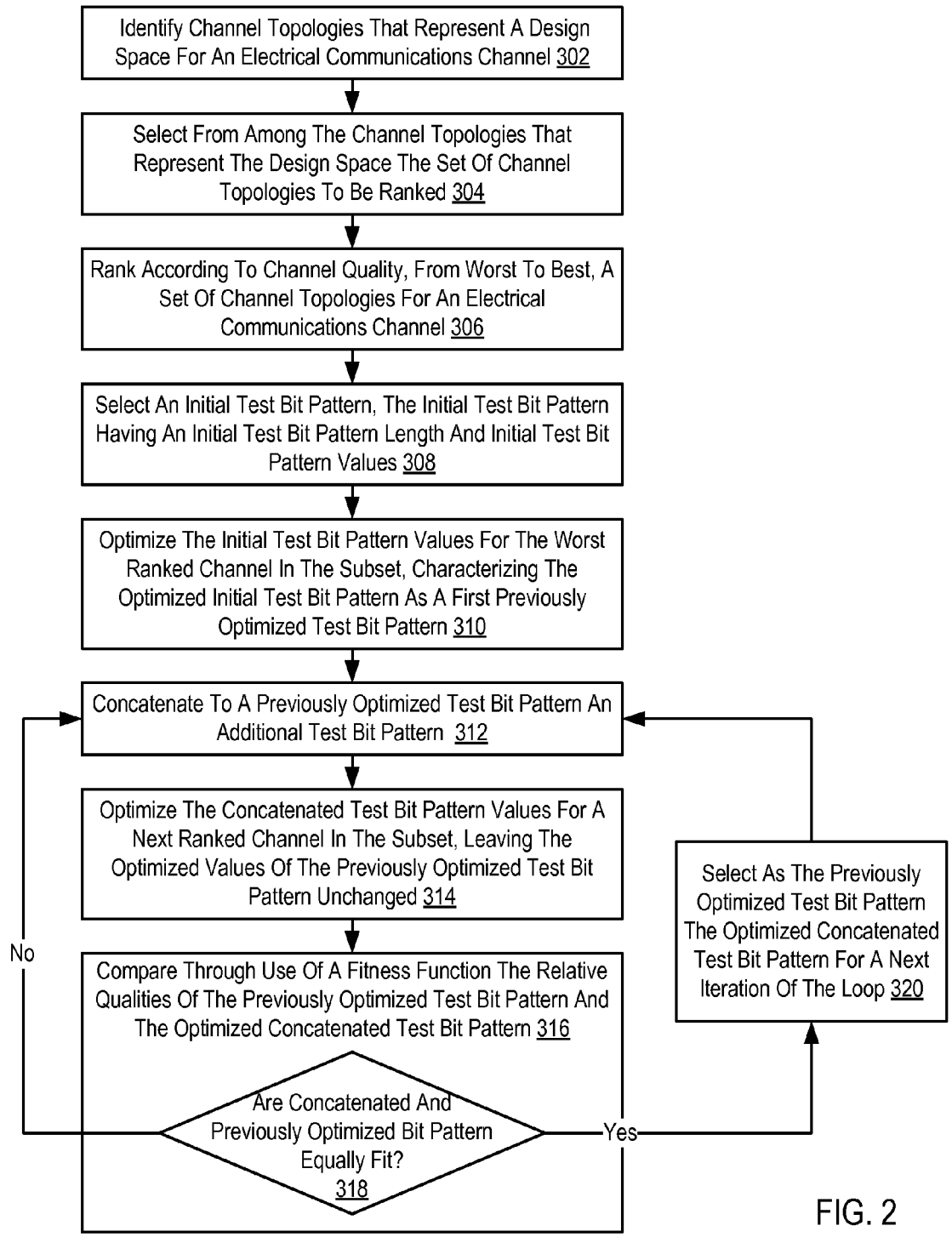
FIG. 2 sets forth a flow chart illustrating an exemplary method for identifying an optimized test bit pattern for analyzing electrical communications channel topologies according to embodiments of the present invention.

For further explanation, FIG. 2 sets forth a flow chart illustrating an exemplary method for identifying an optimized test bit pattern for analyzing electrical communications channel topologies according to embodiments of the present invention. The method of FIG. 2 may be implemented according to embodiments of the present invention by a computer, such as the computer (152) of FIG. 1.

The method of FIG. 2 includes identifying (302) channel topologies that represent a design space for an electrical communications channel. Identifying (302) channel topologies that represent a design space for an electrical communications channel may be carried out by using a design of experiments technique called central composite design. Design of experiments is the design of all information-gathering exercises where variation is present, whether under the full control of the experimenter or not. Central composite design ('CCD') is an experimental design for building a second order, quadratic, model for a response variable without the need for a complete three-level factorial experiment. Given a set of configuration parameters of a particular communications channel and boundary conditions for such variables, a CCD algorithm may generate channel topologies that represent a design space for the electrical communications channel. Readers of skill in the art will recognize that CCD, described here for ease of explanation, is but one of a number of possible ways to identify (302) channel topologies that represent a design space for an electrical communications channel according to embodiments of the present invention.

The method of FIG. 2 also includes selecting (304) from among the channel topologies that represent the design space the set of channel topologies to be ranked. Selecting (304) from among the channel topologies that represent the design space the set of channel topologies to be ranked may be carried out by analyzing frequency domain channel loss of each channel topology for the electrical communications channel and selecting a predefine number of the channel topologies having the worst channel loss. A frequency domain channel loss analysis may include a measurement of insertion loss for a channel topology of a communications channel, a measurement of return loss for a channel topology of a communications channel, or a combination of insertion loss and return loss. Insertion loss is the decrease in transmitted signal power resulting from the insertion of a device in a transmission line. Insertion loss is usually expressed relative to the signal power delivered to that same part before insertion. Return loss is a measure of power reflected from imperfections in an electrical communications channel.

The method of FIG. 2 also includes ranking (306) according to channel quality, from worst to best, a set of channel topologies for an electrical communications channel. Ranking (306) according to channel quality, from worst to best, a set of channel topologies for an electrical communications channel may be carried out by assigning a rank to each channel topology in dependence upon the channel topology's insertion and return channel loss.

The method of FIG. 2 also includes selecting (308) an initial test bit pattern, the initial test bit pattern having an initial test bit pattern length and initial test bit pattern values. Selecting (308) an initial test bit pattern may include identifying a predefined initial test bit pattern length. That is, a user may predefine the initial length of the bit pattern used to begin identifying a channel topology independent optimized test bit pattern for an electrical communications channel in accordance with embodiments of the present invention. Selecting (308) an initial test bit pattern may include using values of a user-defined bit pattern as initial test bit pattern values, using random values as initial test bit pattern values, using bit pattern values of another optimized test bit pattern, and so on as will occur to those of skill in the art.

The method of FIG. 2 also includes optimizing (310) the initial test bit pattern values for the worst ranked channel in the subset, characterizing the optimized initial test bit pattern as a first previously optimized test bit pattern. Optimizing (310) the initial test bit pattern values for the worst ranked channel in the subset may be carried out through use of a particle swarm optimization ('PSO') algorithm or through use of a genetic algorithm ('GA'). A PSO algorithm is a swarm intelligence based algorithm used to find a solution to an optimization problem in a search space, or model and predict social behavior in the presence of objectives. Particle swarm optimization is a stochastic, population-based evolutionary computer algorithm for problem solving. When using a PSO algorithm to optimize the initial test bit pattern values, the swarm includes a set of different bit patterns of the same length and each bit pattern is considered a particle of the swarm where the length of the bit pattern defines the number of dimensions of the search space. The particles are characterized by a position and a velocity. These particles are iteratively flown through hyperspace, that is, the design space, in search of the global optimum solution. Moving the particles through the design space is carried out by iteratively updating the position of every particle. A predefined velocity function determines the required change in the position of each particle each dimension of the design space for each iteration. The fittest position for each particle is tracked throughout its movement through design space and is tracked as well as the fittest position attained by the entire swarm, until an optimum solution for both the swarm and particles is attained.

A GA is a search technique used in computing to find exact or approximate solutions to optimization and search problems. Genetic algorithms are categorized as global search heuristics. Genetic algorithms are a particular class of evolutionary algorithms (also known as evolutionary computation) that use techniques inspired by evolutionary biology such as inheritance, mutation, selection, and crossover (also called recombination).

A genetic algorithm may be implemented as a computer simulations in which a population of abstract representations (called chromosomes or the genotype or the genome) of candidate solutions (called individuals, creatures, or phenotypes) to an optimization problem evolves toward better solutions. The evolution usually starts from a population of randomly generated individuals, in this case randomly generated initial test bit pattern values, and recurs in generations. In each generation, the fitness of every individual in the population is evaluated, multiple individuals are stochastically selected from the current population (based on their fitness), and modified (recombined and possibly randomly mutated) to form a new population. The new population is then used in the next iteration of the algorithm. Commonly, the algorithm terminates when either a maximum number of generations has been produced, or a satisfactory fitness level has been reached for the population. If the algorithm has terminated due to a maximum number of generations, a satisfactory solution may or may not have been reached.

In both PSO and genetic algorithms a fitness function is employed to determine fitness of particular solutions. A fitness function is a type of objective function that quantifies the optimality of a solution such that the particular object for which fitness is determined may be compared to the fitness of other objects.

For each ranked channel topology beginning with the worst, the method of FIG. 2 includes the following steps carried out in an iterative loop until a concatenated test bit pattern and a previously optimized test bit pattern are functionally equally fit: concatenating (312) to a previously optimized test bit pattern an additional test bit pattern, the additional test bit pattern having a predetermined additional test bit pattern length and additional test bit pattern values; optimizing (314) the concatenated test bit pattern values for a next ranked channel in the subset, leaving the optimized values of the previously optimized test bit pattern unchanged; and comparing (316) through use of a fitness function the relative qualities of the previously optimized test bit pattern and the optimized concatenated test bit pattern.

In the method of FIG. 2, optimizing (314) the concatenated test bit pattern values for a next ranked channel in the subset, leaving the optimized values of the previously optimized test bit pattern unchanged may be carried out by optimizing the concatenated test bit pattern values through use of a particle swarm optimization ('PSO') algorithm or through use of a genetic algorithm ('GA') as described above.

In the method of FIG. 2, comparing (316) through use of a fitness function the relative qualities of the previously optimized test bit pattern and the optimized concatenated test bit pattern may be carried out by using each bit pattern to generate an eye diagram for the communications channel, calculating the fitness of each bit pattern in dependence upon eye height and eye width of the generated eye diagrams, and determining whether the difference in fitness between the two bit patterns exceeds a predetermined threshold. Calculating the fitness of either bit pattern may include summing the ratios of measured eye height to ideal eye height and measured eye width to ideal eye width. The term 'functionally' when used here to describe equally fit means that the two bit patterns need not be exactly, precisely equally fit to be considered as such. That is, that the two bit patterns need only be approximately equal within a predefined range, defined by the predetermined threshold described above.

The method of FIG. 2 also includes selecting (320) as the previously optimized test bit pattern the optimized concatenated test bit pattern for a next iteration of the loop. That is, after identifying an optimized test bit pattern for a previous channel topology the method of FIG. 2 proceeds to identify an optimized test bit pattern for a next channel topology using, as a previously optimized test bit pattern, the identified optimized test bit pattern for the previous channel topology. The optimized test bit pattern for the best channel topology of the ranked set, that is the last channel topology for which the iterative loop of concatenating (312), optimizing (314), and comparing (316) is carried out, is a channel topology independent optimized test bit pattern which may be used in analyzing all channel topologies of the electrical communications channel in a electrical circuit simulation application (126 on FIG. 1).

Figure 3:
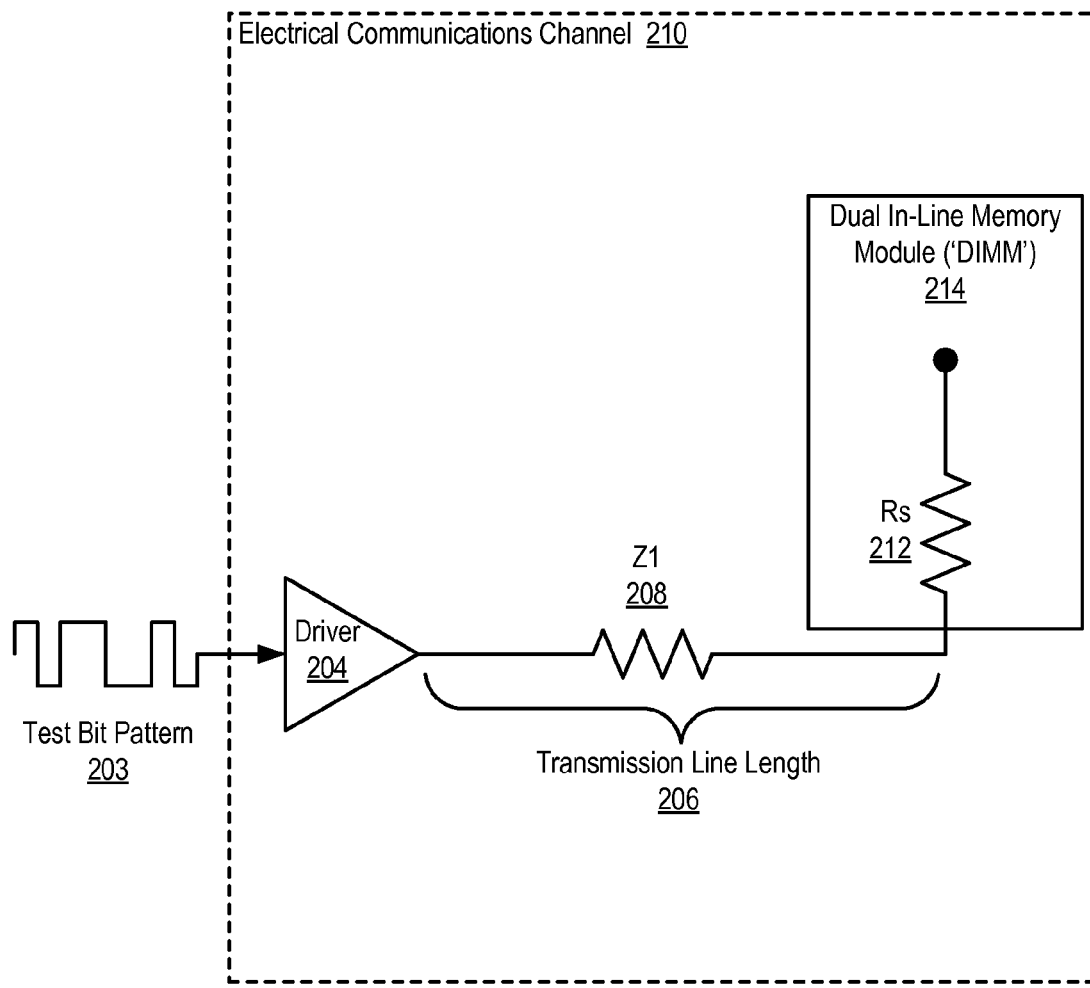
FIG. 3 sets forth a line drawing illustrating an example electrical communications channel for which an optimized test bit pattern for analyzing electrical communications channel topologies was identified in accordance with embodiments of the present invention.

For further explanation, FIG. 3 sets forth a line drawing illustrating an example electrical communications channel (210) for which an optimized test bit pattern for analyzing electrical communications channel topologies was identified in accordance with embodiments of the present invention. The electrical communications channel includes a driver (204) that transmits a test bit pattern (203) along a transmission line to a Dual In-line Memory Module ('DIMM').

The electrical communications channel (210) include several configuration parameters which may be varied for multiple channel topologies of the communications channel (210). Such configuration parameters include driver (204) strength, transmission line length (206), the inductance 'Z1' (208) of the transmission line, and the DIMM resistance 'Rs' (212).

An optimized test bit pattern for analyzing electrical communications channel topologies was identified for the electrical communications channel of FIG. 3 according to embodiments of the present invention. Five worst case channels were ranked according to channel quality and for each ranked channel topology beginning with the worst, the following steps were carried out in an iterative loop until a concatenated test bit pattern and a previously optimized test bit pattern are functionally equally fit: concatenating to a previously optimized test bit pattern an additional test bit pattern, the additional test bit pattern having a predetermined additional test bit pattern length and additional test bit pattern values; optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern. The optimized test bit pattern identified by this iterative process was 150 bits in length.

Tables 1a to 1f below include measurements of eye height and eye width generated when using the identified optimized test bit pattern, three different non-optimized test bit patterns of the same length as the optimized test bit pattern length, and a non-optimized test bit pattern of 2000 bits through six different channel topologies not used in identifying the optimized bit test pattern. The first channel topology for which results are displayed in Table 1a below is defined by a minimum driver (204) strength, a typical DIMM resistance 'Rs' (212), a transmission line length (206) of 6 inches, and a transmission line impedance Z1 (208) of 45 ohms.

TABLE 1a

Driver Strength = min
DIMM resistance = typ
Transmission Line Length = 6 inches
Z1 = 45 ohms

| Test Bit Pattern | Eye Height (mV) | Eye Width (picoseconds) |
| --- | --- | --- |
| Random 150 #1 | 146.11 | 518.25 |
| Random 150 #2 | 150.28 | 501.00 |
| Random 150 #3 | 143.97 | 476.25 |
| Random 2000 | 95.53 | 477.00 |
| Optimized 150 | 89.33 | 471.00 |

The second channel topology for which results are displayed in table 1b below is defined by a minimum driver (204) strength, a minimum DIMM resistance 'Rs' (212), a transmission line length (206) of 6 inches, and a transmission line impedance Z1 (208) of 45 ohms.

TABLE 1b

Driver Strength = min
DIMM resistance = min
Transmission Line Length = 6 inches
Z1 = 45 ohms

| Test Bit Pattern | Eye Height (mV) | Eye Width (picoseconds) |
| --- | --- | --- |
| Random 150 #1 | 2.52 | 1.50 |
| Random 150 #2 | 74.24 | 449.25 |
| Random 150 #3 | 67.20 | 365.25 |
| Random 2000 | 2.60 | 1.50 |
| Optimized 150 | 2.58 | 1.50 |

The third channel topology for which results are displayed in table 1c below is defined by a typical driver (204) strength, a typical DIMM resistance 'Rs' (212), a transmission line length (206) of 6 inches, and a transmission line impedance Z1 (208) of 45 ohms.

TABLE 1c

Driver Strength = typ
DIMM resistance = typ
Transmission Line Length = 6 inches
Z1 = 45 ohms

| Test Bit Pattern | Eye Height (mV) | Eye Width (picoseconds) |
| --- | --- | --- |
| Random 150 #1 | 182.68 | 536.25 |
| Random 150 #2 | 180.02 | 529.50 |
| Random 150 #3 | 186.87 | 525.75 |
| Random 2000 | 148.43 | 511.50 |
| Optimized 150 | 146.21 | 506.25 |

The fourth channel topology for which results are displayed in table 1d below is defined by a minimum driver (204) strength, a minimum DIMM resistance 'Rs' (212), a transmission line length (206) of 10 inches, and a transmission line impedance Z1 (208) of 35 ohms.

TABLE 1d

Driver Strength = min
DIMM resistance = min
Transmission Line Length = 10 inches
Z1 = 35 ohms

| Test Bit Pattern | Eye Height (mV) | Eye Width (picoseconds) |
| --- | --- | --- |
| Random 150 #1 | 185.79 | 478.50 |
| Random 150 #2 | 129.82 | 488.25 |
| Random 150 #3 | 132.23 | 489..00 |
| Random 2000 | 113.83 | 471.00 |
| Optimized 150 | 113.02 | 468.00 |

The fifth channel topology for which results are displayed in table 1e below is defined by a minimum driver (204) strength, a minimum DIMM resistance 'Rs' (212), a transmission line length (206) of 10 inches, and a transmission line impedance Z1 (208) of 45 ohms.

TABLE 1e

Driver Strength = min
DIMM resistance = min
Transmission Line Length = 10 inches
Z1 = 45 ohms

| Test Bit Pattern | Eye Height (mV) | Eye Width (picoseconds) |
| --- | --- | --- |
| Random 150 #1 | 168.03 | 513.00 |
| Random 150 #2 | 155.46 | 512.25 |
| Random 150 #3 | 161.51 | 517.50 |
| Random 2000 | 134.95 | 491.25 |
| Optimized 150 | 127.71 | 494.25 |

The sixth channel topology for which results are displayed in table 1f below is defined by a typical driver (204) strength, a minimum DIMM resistance 'Rs' (212), a transmission line length (206) of 6 inches, and a transmission line impedance Z1 (208) of 45 ohms.

TABLE 1f

Driver Strength = typ
DIMM resistance = min
Transmission Line Length = 6 inches
Z1 = 45 ohms

| Test Bit Pattern | Eye Height (mV) | Eye Width (picoseconds) |
| --- | --- | --- |
| Random 150 #1 | 121.71 | 511.50 |
| Random 150 #2 | 118.89 | 510.00 |

TABLE 1f-continued

Driver Strength = typ
DIMM resistance = min
Transmission Line Length = 6 inches
Z1 = 45 ohms

| Test Bit Pattern | Eye Height (mV) | Eye Width (picoseconds) |
|---|---|---|
| Random 150 #3 | 123.69 | 496.50 |
| Random 2000 | 77.15 | 481.50 |
| Optimized 150 | 75.62 | 479.25 |

As can be seen from Figure 1a through 1f above, eye heights and widths obtained from the optimized 150 bits were functionally equal to results obtained from a random 2000 bit test bit pattern. That is, the analysis of the communications channel topologies using the optimized 150 bit long test bit pattern provided accurate results for all channel topologies. The results also show that if a short, random non-optimized test bit pattern is used, results may be inaccurate between channel topologies. For example, the first random bit stream of length 150 bits ('Random 150 #1') provides accurate results when analyzing the channel topology of Table 1b compared to the random 2000 bit pattern and the optimized test bit pattern but the same random bit pattern of 150 bits provides inaccurate results for the channel topology of Table 1a when compared to the random 2000 bit pattern and optimized test bit pattern.

In view of the explanations set forth above, readers will recognize that the benefits of identifying an optimized test bit pattern for analyzing electrical communications channel topologies according to embodiments of the present invention include:

Providing a relatively short and accurate test bit pattern such that analysis of a channel topology in a circuit simulation is less time-consuming and requires less computational overhead.

Providing a relatively short channel topology independent test bit pattern that provides accurate analysis of different channel topologies of an electrical communications channel such that a different bit pattern for each channel topology need not be identified.

And others as may occur to those of skill in the art.

Exemplary embodiments of the present invention are described largely in the context of a fully functional computer system for identifying an optimized test bit pattern for analyzing electrical communications channel topologies. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of identifying an optimized test bit pattern for analyzing electrical communications channel topologies, the method comprising:

ranking according to channel quality, from worst to best, a set of channel topologies for an electrical communications channel; and for each ranked channel topology beginning with the worst, carrying out the following steps in an iterative loop until a concatenated test bit pattern and a previously optimized test bit pattern are functionally equally fit:

concatenating to a previously optimized test bit pattern an additional test bit pattern, the additional test bit pattern having a predetermined additional test bit pattern length and additional test bit pattern values;

optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

2. The method of claim 1 further comprising:

identifying channel topologies that represent a design space for an electrical communications channel; and selecting from among the channel topologies that represent the design space the set of channel topologies to be ranked.

3. The method of claim 1 further comprising:

selecting an initial test bit pattern, the initial test bit pattern having an initial test bit pattern length and initial test bit pattern values; and optimizing the initial test bit pattern values for the worst ranked channel in the subset, characterizing the optimized initial test bit pattern as a first previously optimized test bit pattern.

4. The method of claim 1 further comprising selecting as the previously optimized test bit pattern the optimized concatenated test bit pattern for a next iteration of the loop.

5. The method of claim 1 wherein optimizing the concatenated test bit pattern values for a next ranked channel in the subset, leaving the optimized values of the previously optimized test bit pattern unchanged further comprises:

optimizing the concatenated test bit pattern values through use of a particle swarm optimization ('PSO') algorithm.

6. The method of claim 1 wherein optimizing the concatenated test bit pattern values for a next ranked channel in the subset, leaving the optimized values of the previously optimized test bit pattern unchanged further comprises:

optimizing the concatenated test bit pattern values through use of a genetic algorithm ('GA').

7. An apparatus for identifying an optimized test bit pattern for analyzing electrical communications channel topologies, the apparatus comprising a computer processor, a computer memory operatively coupled to the computer processor, the computer memory including computer program instructions that, when executed by the computer processor, cause the apparatus to carry out the steps of:

ranking according to channel quality, from worst to best, a set of channel topologies for an electrical communications channel; and for each ranked channel topology beginning with the worst, carrying out the following steps in an iterative loop until a concatenated test bit pattern and a previously optimized test bit pattern are functionally equally fit:

concatenating to a previously optimized test bit pattern an additional test bit pattern, the additional test bit pattern having a predetermined additional test bit pattern length and additional test bit pattern values;

optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

8. The apparatus of claim 7 further comprising computer program instructions that, when executed by the computer processor, cause the apparatus to carry out the steps of:

identifying channel topologies that represent a design space for an electrical communications channel; and selecting from among the channel topologies that represent the design space the set of channel topologies to be ranked.

9. The apparatus of claim 7 further comprising computer program instructions that, when executed by the computer processor, cause the apparatus to carry out the steps of:

selecting an initial test bit pattern, the initial test bit pattern having an initial test bit pattern length and initial test bit pattern values; and optimizing the initial test bit pattern values for the worst ranked channel in the subset, characterizing the optimized initial test bit pattern as a first previously optimized test bit pattern.

10. The apparatus of claim 7 further comprising computer program instructions that, when executed by the computer processor, cause the apparatus to carry out the step of selecting as the previously optimized test bit pattern the optimized concatenated test bit pattern for a next iteration of the loop.

11. The apparatus of claim 7 wherein optimizing the concatenated test bit pattern values for a next ranked channel in the subset, leaving the optimized values of the previously optimized test bit pattern unchanged further comprises:

optimizing the concatenated test bit pattern values through use of a particle swarm optimization ('PSO') algorithm.

12. The apparatus of claim 7 wherein optimizing the concatenated test bit pattern values for a next ranked channel in the subset, leaving the optimized values of the previously optimized test bit pattern unchanged further comprises:

optimizing the concatenated test bit pattern values through use of a genetic algorithm ('GA').

13. A computer program product for identifying an optimized test bit pattern for analyzing electrical communications channel topologies, the computer program product disposed in a non-transmission computer readable medium, wherein the non-transmission computer readable medium is not a signal, the computer program product comprising computer program instructions that, when executed by a computer, cause the computer to carry out the steps of:

ranking according to channel quality, from worst to best, a set of channel topologies for an electrical communications channel; and for each ranked channel topology beginning with the worst, carrying out the following steps in an iterative loop until a concatenated test bit pattern and a previously optimized test bit pattern are functionally equally fit:

concatenating to a previously optimized test bit pattern an additional test bit pattern, the additional test bit pattern having a predetermined additional test bit pattern length and additional test bit pattern values;

optimizing the concatenated test bit pattern values for a next ranked channel in the subset, leaving the optimized values of the previously optimized test bit pattern unchanged; and comparing through use of a fitness function the relative qualities of the previously optimized test bit pattern and the optimized concatenated test bit pattern.

14. The computer program product of claim 13 further comprising computer program instructions that, when executed by the computer, cause the computer to carry out the steps of:

identifying channel topologies that represent a design space for an electrical communications channel; and selecting from among the channel topologies that represent the design space the set of channel topologies to be ranked.

15. The computer program product of claim 13 further comprising computer program instructions that, when executed by the computer, cause the computer to carry out the steps of:

selecting an initial test bit pattern, the initial test bit pattern having an initial test bit pattern length and initial test bit pattern values; and optimizing the initial test bit pattern values for the worst ranked channel in the subset, characterizing the optimized initial test bit pattern as a first previously optimized test bit pattern.

16. The computer program product of claim 13 further comprising computer program instructions that, when executed by the computer, cause the computer to carry out the step of-selecting as the previously optimized test bit pattern the optimized concatenated test bit pattern for a next iteration of the loop.

17. The computer program product of claim 13 wherein optimizing the concatenated test bit pattern values for a next ranked channel in the subset, leaving the optimized values of the previously optimized test bit pattern unchanged further comprises:

optimizing the concatenated test bit pattern values through use of a particle swarm optimization ('PSO') algorithm.

18. The computer program product of claim 13 wherein optimizing the concatenated test bit pattern values for a next ranked channel in the subset, leaving the optimized values of the previously optimized test bit pattern unchanged further comprises:

optimizing the concatenated test bit pattern values through use of a genetic algorithm ('GA').

\* \* \* \* \*